United States Patent [19]
Urbach

[11] Patent Number: 6,135,471
[45] Date of Patent: Oct. 24, 2000

[54] SUSPENSION SYSTEM

[75] Inventor: Brian A. Urbach, Rochester Hills, Mich.

[73] Assignee: TRW Inc., Lyndhurst, Ohio

[21] Appl. No.: 09/197,863

[22] Filed: Nov. 23, 1998

[51] Int. Cl.$^7$ .................................................. B60G 7/00
[52] U.S. Cl. ............................ 280/124.137; 280/124.167
[58] Field of Search .................... 280/124.1, 124.131, 280/124.134, 124.135, 124.137, 124.138, 124.166, 124.167

[56] References Cited

U.S. PATENT DOCUMENTS

| | | | |
|---|---|---|---|
| 2,245,809 | 6/1941 | Olley | 280/124.137 |
| 2,794,652 | 6/1957 | Kolbe . | |
| 2,820,646 | 1/1958 | Kolbe . | |
| 2,998,263 | 8/1961 | Muller et al. . | |
| 3,037,789 | 6/1962 | Allison | 280/124.137 |
| 3,692,295 | 9/1972 | Cass et al. . | |
| 4,022,494 | 5/1977 | Allison . | |
| 4,033,605 | 7/1977 | Smith et al. . | |
| 4,158,511 | 6/1979 | Herbenar . | |
| 4,641,856 | 2/1987 | Reicenbach . | |
| 4,836,516 | 6/1989 | Wycech . | |
| 5,080,520 | 1/1992 | Wood, Jr. . | |
| 5,118,070 | 6/1992 | Reid . | |
| 5,246,245 | 9/1993 | Sato et al. . | |
| 5,249,817 | 10/1993 | Bruhl . | |
| 5,556,119 | 9/1996 | Buchner et al. . | |
| 5,788,264 | 8/1998 | Adkins et al. . | |

*Primary Examiner*—Brian L. Johnson
*Assistant Examiner*—Bryan Fischmann
*Attorney, Agent, or Firm*—Tarolli, Sundheim, Covell, Tummino & Szabo L.L.P.

[57] ABSTRACT

An apparatus for use in a vehicle suspension system includes a torsion bar (38) having a fixed end portion (48) which is held against movement relative to a frame of the vehicle. A movable end portion (56) of the torsion bar (38) is connected with a support member (18) for a steerable vehicle wheel (12). A retainer (70) encloses an intermediate portion (72) of the torsion bar (38) to resist sidewise movement of an intermediate portion of the torsion bar during twisting of the torsion bar. A strut (80) is integrally formed as one piece with the torsion bar (38).

15 Claims, 3 Drawing Sheets

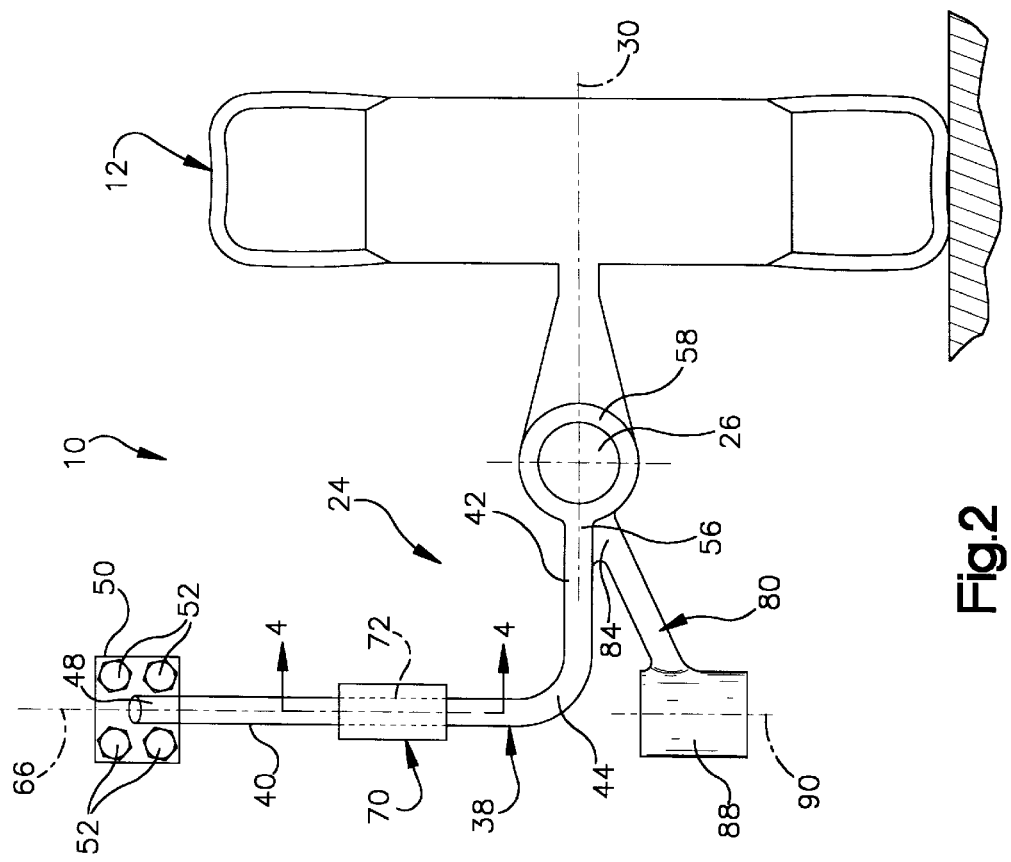
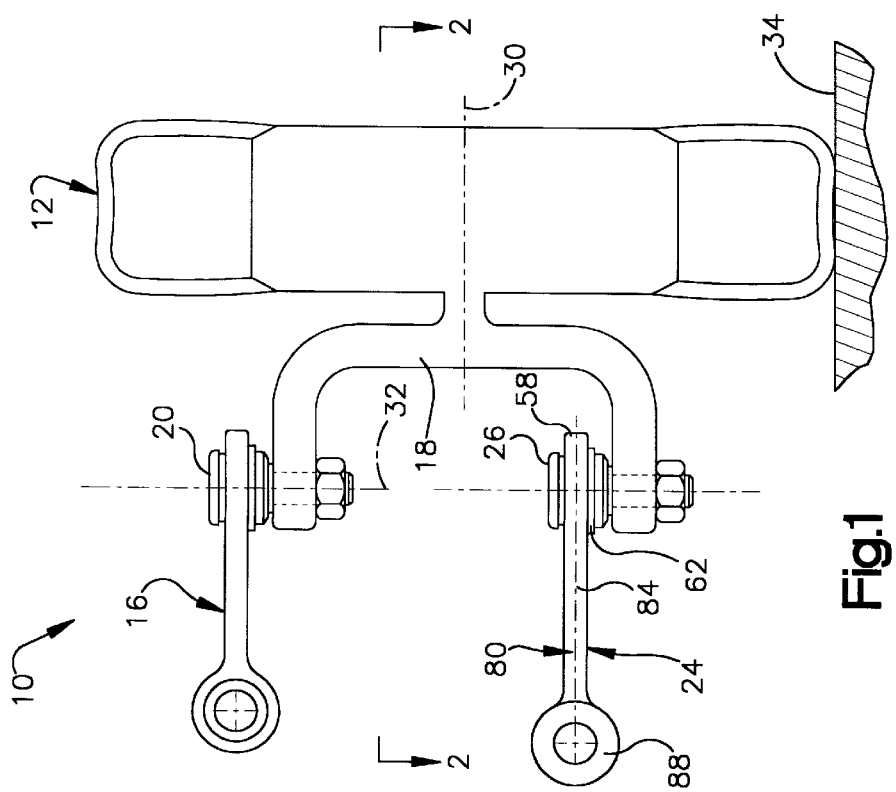

SUSPENSION SYSTEM

BACKGROUND OF THE INVENTION

The present invention relates to an apparatus for use in a suspension system for a steerable vehicle wheel.

Steerable vehicle wheels commonly use either a short-long arm suspension system or a strut suspension system. In a short-long arm suspension system, a short upper control arm and a longer lower control arm are connected with a steering knuckle or support member on which a vehicle wheel is rotatably mounted. A known control arm which may be used in such a suspension system is disclosed in U.S. Pat. No. 5,556,119. It has previously been suggested that torsion bars could be used in suspension systems for steerable vehicle wheels. Known suspension systems for steerable vehicle wheels using one or more torsion bars are disclosed in U.S. Pat. Nos. 3,692,295 and 4,022,494.

SUMMARY OF THE INVENTION

The present invention relates to a new and improved apparatus for use in a suspension system for a steerable vehicle wheel. The apparatus includes a torsion bar having a fixed end portion which is held against movement relative to a frame of the vehicle. A movable end portion of the torsion bar is connected with a support member for the steerable vehicle wheel. A retainer encloses a portion of the torsion bar to resist sidewise movement of the enclosed portion of the torsion bar during operation of the vehicle.

A strut is provided to maintain the steerable vehicle wheel in a desired orientation during operation of the vehicle. One end of the strut is connected with a movable end of the torsion bar. The other end of the strut is pivotal relative to the frame of the vehicle. The torsion bar and strut may advantageously be integrally formed as one piece.

BRIEF DESCRIPTION OF THE DRAWINGS

The foregoing and other features of the present invention will become more apparent to one skilled in the art to which the present invention relates upon consideration of the following description of the invention with reference to the accompanying drawings, wherein:

FIG. 1 is a simplified front schematic illustration of a suspension system constructed in accordance with the present invention for a wheel of a vehicle;

FIG. 2 is a simplified schematic plan view, taken along the line 2—2 of FIG. 1, further illustrating the construction of the suspension system;

DESCRIPTION OF ONE SPECIFIC PREFERRED EMBODIMENT OF THE INVENTION

General Description

Figure 3:
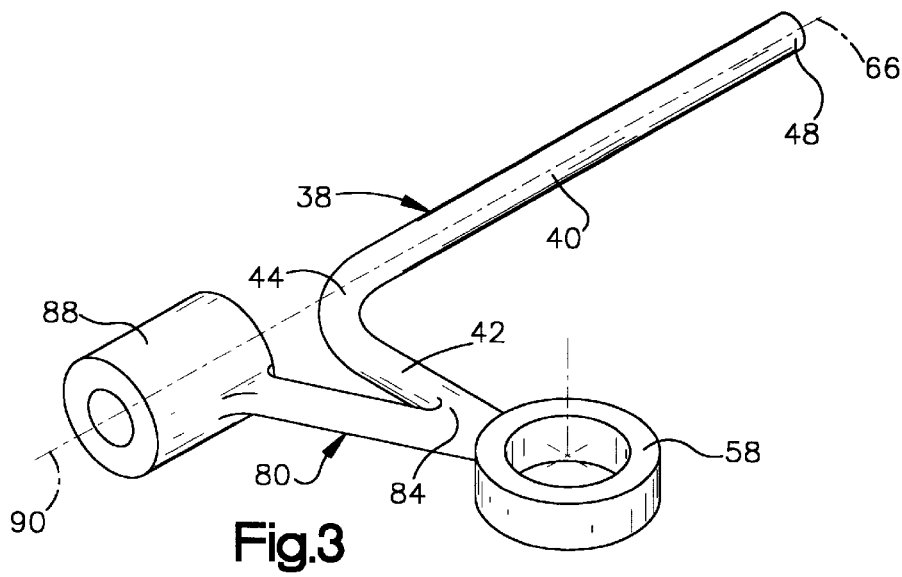
FIG. 3 is a pictorial illustration of a one-piece torsion bar and strut used in the suspension system of FIGS. 1 and 2.

An improved suspension system 10 for a front steerable wheel 12 is illustrated in FIG. 1. The suspension system 10 is of the well known short-long arm type and includes a short upper control arm 16 which is connected with a wheel support member or steering knuckle 18 by an upper ball joint 20. The wheel 12 is rotatably mounted on a spindle (not shown) which extends outward from the steering knuckle 18.

The suspension system 10 includes a lower control arm 24 having a length which is longer than the length of the upper control arm 16. The lower control arm 24 is connected with the steering knuckle 18 by a lower ball joint 26.

During operation of the vehicle, the vehicle wheel 12 rotates about an axis 30 which extends generally parallel to a road or other support surface 3,4 which is engaged by the vehicle wheel 12. To effect a steering operation, the steering knuckle 18 is rotated about a vertical axis 32 in a known manner. The relatively short upper control arm and relatively long lower control arm 24 cooperate to control the track width of the front wheels of the vehicle and the camber angle of the wheel 12.

Torsion Bar

In accordance with the present invention, the lower control arm 24 includes a one-piece metal torsion bar 38 (FIG. 2). The torsion bar 38 has a generally L-shaped configuration. Thus, the torsion bar has a relatively long linear rearwardly extending leg 40 and a relatively short linear sidewardly extending leg 42. The rearwardly and sidewardly extending legs 40 and 42 are interconnected by an arcuate bend 44.

The rearwardly extending leg 40 has an end portion 48 which is fixedly secured to a frame (not shown) of the vehicle by a mounting bracket 50. The mounting bracket 50 is connected with the frame of the vehicle by suitable fasteners 52. The mounting bracket 50 holds the end portion 48 of the rearwardly extending leg 40 of the torsion bar 38 against rotational movement relative to the frame of the vehicle. In addition, the mounting bracket 50 holds the end portion 48 of the rearwardly extending leg 40 of the torsion bar 38 against axial and sidewise movement relative to the frame of the vehicle. Thus, the mounting bracket 50 holds the end portion 48 of the rearwardly extending leg 40 of the torsion bar 38 stationary relative to the frame of the vehicle.

The sidewardly extending leg 42 (FIG. 2) of the torsion bar 38 has an end portion 56 which is connected with the lower ball joint 26 by a mounting ring 58. The mounting ring 58 encircles and is fixedly connected with a housing 62 (FIG. 1) of the lower ball joint 26. The mounting ring 58 is integrally formed as one piece with the sidewardly extending leg 42 of the torsion bar 38.

During movement of the wheel 12 along a support surface or road 34 (FIG. 1), the wheel and steering knuckle 18 move up and down as the wheel encounters projections in the road and/or depressions in the road. The end portion 56 (FIG. 2) of the sidewardly extending leg 42 of the torsion bar 38 moves up and down with the lower ball joint 26 during operation of the vehicle. This up and down movement of the end portion 56 of the sidewardly extending leg 42 of the torsion bar 38 is effective to resiliently twist the rearwardly extending leg 40 of the torsion bar 38 about a longitudinally extending central axis 66 of the rearwardly extending leg 40 of the torsion bar. This twisting of the rearwardly extending leg 40 of the torsion bar occurs in the portion of the torsion bar disposed between the fixedly mounted end portion 48 of the torsion bar and the bend 44.

A retainer 70 is connected to the frame of the vehicle and holds an intermediate portion 72 of the torsion bar 38 against sidewise movement, that is, against movement in a direction transverse to the longitudinal central axis 66 of the rearwardly extending leg 40 of the torsion bar. However, the retainer 70 is ineffective to hold the intermediate portion 72 of the torsion bar 38 against rotational movement under the influence of torsional forces transmitted from the sidewardly extending leg 42 of the torsion bar to the rearwardly extending leg 40.

Strut

A linear metal strut 80 is connected with the lower ball joint 26 and the sidewardly extending leg 42 of the torsion bar 38. The strut 80 extends forwardly at an acute angle from the sidewardly extending leg 42 of the torsion bar 38. The strut 80 prevents the torsion bar 38 from moving either forwardly or rearwardly relative to the frame of the vehicle. However, the strut 80 allows the rearwardly extending leg 40 of the torsion bar to be twisted and thereby rotate about the axis 66.

The strut 80 includes an end portion 84 which is connected with the end portion 56 of the torsion bar 38 and the lower ball joint 26 at the mounting ring 58. The strut has a cylindrical end portion 88 (FIGS. 1 and 2) which is pivotally mounted to the frame of the vehicle. The end portion 88 of the strut 80 is pivotal about an axis 90 which is coincident with the longitudinal central axis 66 of the rearwardly extending leg 40 of the torsion bar 38 (FIG. 2).

The end portion 88 of the strut 80 is free to rotate in either a clockwise or counterclockwise direction, as viewed in FIG. 1, during operation of the vehicle 12 and movement of the vehicle along the road 34. However, the strut 80 is effective to prevent sideward movement of the lower ball joint 26 under the influence of forces applied against the wheel 12 by the road 24 during operation of the vehicle. In addition, the strut 80 holds the end portion 56 of the torsion bar 38 against forward and rearward movement under the influence of forces applied against the wheel 12 by the road 34.

The strut 80 and torsion bar 38 are integrally formed as one piece (FIG. 3). Thus, a single piece of metal is plastically deformed to form the torsion bar 38 and strut 80. The unified construction of the torsion bar 38 and strut 80 enables them to cooperate so as to transmit forces which maintain the wheel 12 in a desired orientation relative to the frame of the vehicle during operation of the vehicle.

Retainer

The retainer 70 (FIG. 4) extends around an intermediate portion 72 of the rearwardly extending leg 40 of the torsion bar 38. The retainer 72 includes a tubular cylindrical body 100 of elastomeric material which resists sidewise movement of the intermediate portion 72 of the torsion bar 38. The body 100 of elastomeric material is disposed between a cylindrical outer housing 102 and a cylindrical inner housing 104.

The inner and outer housings 102 and 104 are disposed in a coaxial relationship with the rearwardly extending leg 40 of the torsion bar 38. The body 100 of elastomeric material has a cylindrical outer side surface 108 which is bonded to the cylindrical outer housing 102. Similarly, the body 100 of elastomeric material has a cylindrical inner side surface 110 which is bonded to the inner housing 104.

The intermediate portion 72 of the torsion bar 38 extends through a tubular metal stud 114. The tubular stud 114 includes a cylindrical sidewall 116 and an annular ball section 118. The cylindrical sidewall 116 and ball section 118 are disposed in a coaxial relationship with the rearwardly extending leg 40 of the torsion bar 38. The ball section 118 has an arcuate outer side surface 122 which forms a portion of a hemisphere.

A cylindrical passage 126 extends through the sidewall 116 and ball section 118. The passage 126 has an interference fit with the cylindrical outer side surface of the intermediate portion 72 of the rearwardly extending leg 40 of the torsion bar 38. Therefore, the tubular stud 114 is fixedly connected with the rearwardly extending leg 40 of the torsion bar 38.

A pair of annular bearings 130 and 132 are disposed between the arcuate outer side surface 122 on the ball section 118 of the tubular stud 114 and the inner housing 104. The annular bearings 130 and 132 are formed of a polymeric material and support the ball section 118 of the tubular stud 114 for rotation relative to the inner housing 104 and the frame of the vehicle. A pair of flexible rubber boot seals 136 and 138 enclose opposite ends of the inner housing 104 to prevent dirt from entering the inner housing.

Figure 4:
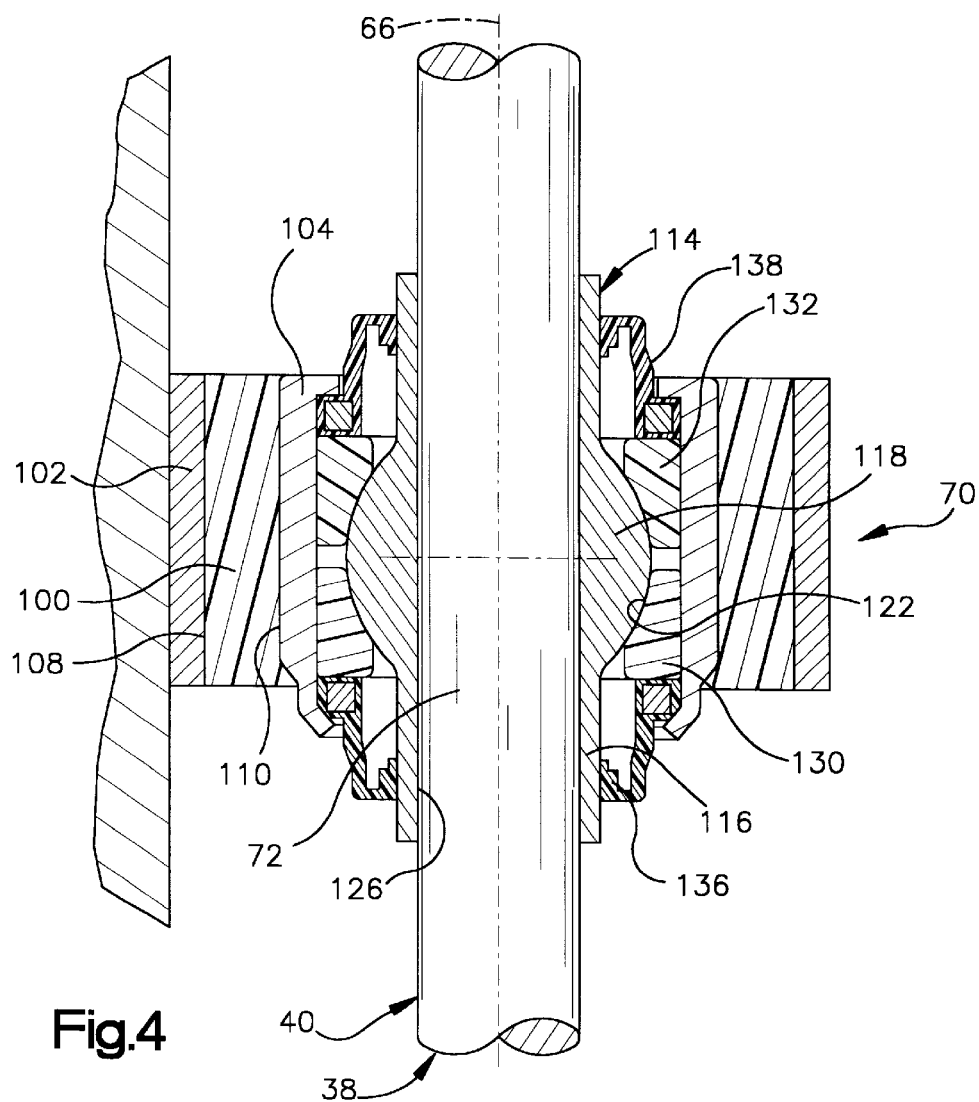
FIG. 4 is a schematic sectional view, taken generally along the line 4—4 of FIG. 2, illustrating the construction of a retainer which resists sidewise movement of a portion of the torsion bar.

In the embodiment of the retainer 70 illustrated in FIG. 4, the body 100 of elastomeric material provides a cushion to absorb vibration. It is contemplated that a piezoelectric device could be utilized instead of the body 100 of elastomeric material to absorb vibration if desired. Although one specific retainer 70 has been illustrated in FIG. 4, it is contemplated that the retainer could have a different construction. For example, the retainer could have a construction similar to that disclosed in U.S. Pat. No. 5,080,520 or in U.S. Pat. No. 4,158,511 if desired.

Operation

During operation of the vehicle, the wheel 12 rolls along the road 34 (FIG. 1). When the wheel encounters a bump, the wheel is displaced upward (as viewed in FIG. 1). This upward movement of the wheel 12 results in the strut 80 pivoting in a counterclockwise direction (as viewed in FIG. 1) about the axis 90 which extends through the end portion 88 (FIG. 2) of the strut.

The end portion 58 of the sidewardly extending leg 42 of the torsion bar 38 moves with the strut 80. Therefore, upward pivoting movement of the strut 80 results in upward pivoting movement of the sidewardly extending leg 42 of the torsion bar 38 about the axis 66. This results in the rearwardly extending leg 40 of the torsion bar 38 being twisted, that is resiliently deflected, about the axis 66. At this time, the mounting bracket 50 firmly holds the end portion 48 of the torsion bar 38 against movement relative to the frame of the vehicle.

The retainer 70 resists sidewise movement of the leg 40 of the torsion bar 38. The retainer 70 holds the leg 40 of the torsion bar against movement in a direction perpendicular to the longitudinally extending central axis 66 of the rearwardly extending leg 40. Although the retainer 72 is effective to hold the leg 40 of the torsion bar 38 against sidewise movement, the retainer 72 is ineffective to hold the leg against rotational twisting about the central axis 66. The retainer includes a body 100 of elastomeric material which resists sidewise movement of the rearwardly extending leg 40 of the torsion bar 38 and absorbs vibrations transmitted through the torsion bar.

Suspension System—Second Embodiment

Figure 5:
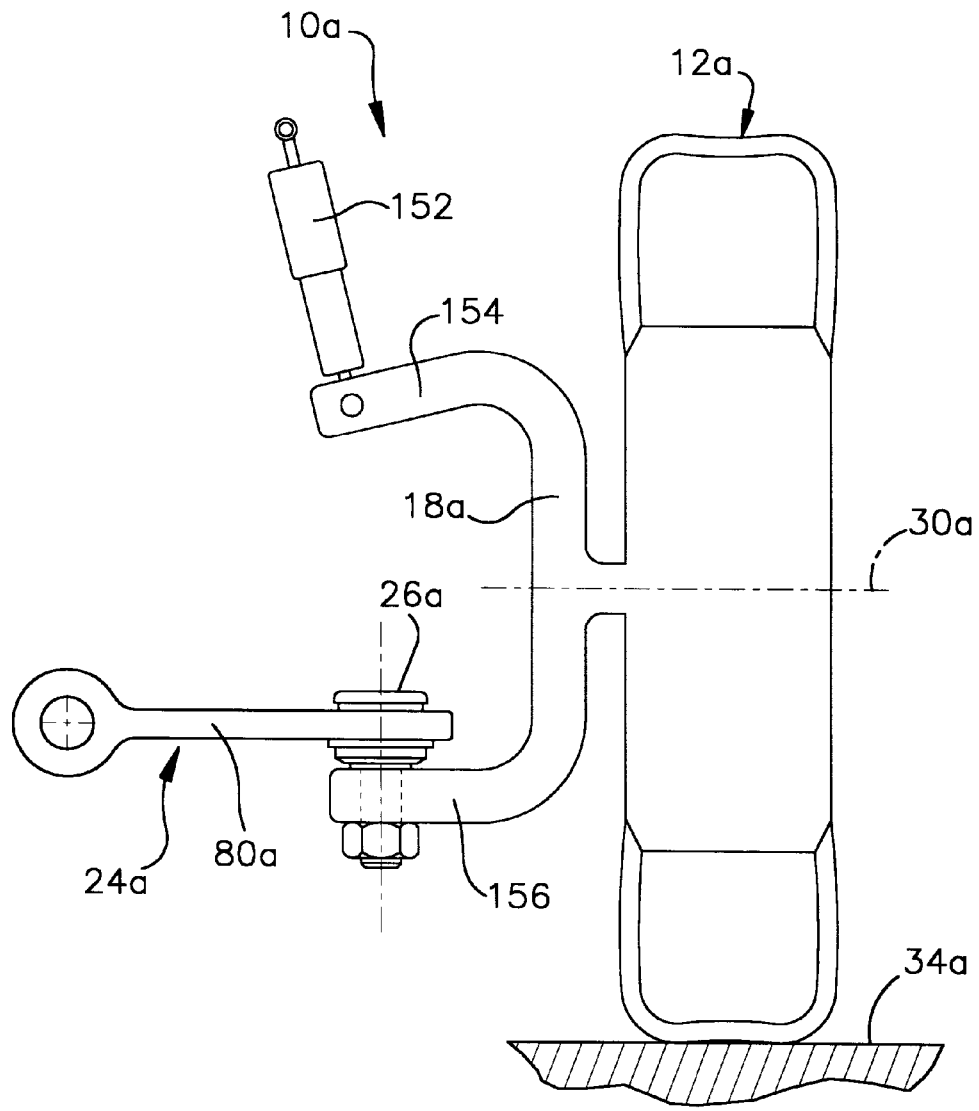
FIG. 5 is a simplified front schematic illustration, generally similar to FIG. 1, of a second embodiment of the suspension system.

In the embodiment of the invention illustrated in FIGS. 1–4, the suspension system 10 is of the short-long arm type, that is, the upper control arm 16 is shorter than the lower control arm 24. In the embodiment of the invention illustrated in FIG. 5, the suspension system is a strut-type suspension. Since the embodiment of the invention illustrated in FIG. 5 is generally similar to the embodiment of the invention illustrated in FIGS. 1–4, similar numerals will be utilized to designate similar components, the suffix letter "a" being associated with the numerals of FIG. 5 to avoid confusion.

A suspension system 10a (FIG. 5) supports a steerable vehicle wheel 12a. The steerable vehicle wheel 12a is rotatable about a horizontal axis 30a and engages a road 34a or other support surface. The wheel 12a is rotatably supported on a spindle extending from a steering knuckle 18a.

In accordance with a feature of this embodiment of the invention, a strut 152 (FIG. 5) is connected with an upper portion 154 of the steering knuckle 18a. The strut may include an oversized, telescoping shock absorber and a spring which extends around the shock absorber. The strut 152 is connected with the steering knuckle 18a in a well-known manner.

A lower control arm 24a is connected with a lower ball joint 26a. The lower ball joint 26a connects the lower control arm 24a with a lower portion 156 of the steering knuckle 18a. The lower control arm 24a has the same construction as the lower control arm 24 of FIGS. 1–3. A retainer, corresponding to the retainer 70 of FIG. 4, is provided in association with a torsion bar, corresponding to the torsion bar 38 of FIGS. 2 and 3. A strut 80a is integrally formed as one piece with the torsion bar in the same manner as previously described in conjunction with the embodiment of the invention illustrated in FIGS. 1–4. It should be understood that a shock absorber or other damper could be connected with the lower control arm 24 of the embodiment of the invention illustrated in FIGS. 1–4.

From the above description of the invention, those skilled in the art will perceive improvements, changes and modifications. Such improvements, changes and modifications within the skill of the art are intended to be covered by the appended claims.

What is claimed is:

1. An apparatus for use in a suspension system for a steerable vehicle wheel, said apparatus comprising:
   a torsion bar having a fixed end portion held against movement relative to a frame of the vehicle, a movable end portion connected with a support member for the steerable vehicle wheel, and an intermediate portion disposed between said fixed and movable end portions, said movable end portion of said torsion bar being movable up and down relative to said fixed end portion of said torsion bar to resiliently twist said torsion bar about a longitudinal central axis of said intermediate portion of said torsion bar during operation of the vehicle;
   a retainer extending around said intermediate portion of said torsion bar, said intermediate portion of said torsion bar being held by said retainer to resist movement of said intermediate portion of said torsion bar in a direction transverse to the longitudinal central axis of said intermediate portion of said torsion bar, said retainer being ineffective to hold said intermediate portion of said retainer against rotation about the longitudinal central axis of said torsion bar; and
   a strut having a first end portion connected with said movable end portion of said torsion bar, said strut having a second end portion pivotally connected with the frame of the vehicle, said second end portion of said strut being pivotal about an axis extending parallel to the longitudinal central axis of said intermediate portion of said torsion bar.

2. An apparatus as set forth in claim 1 further including a ball joint having a housing fixedly connected with said movable end portion of said torsion bar and said first end portion of said strut.

3. An apparatus as set forth in claim 2 wherein said strut and said torsion bar are integrally formed as one piece.

4. An apparatus as set forth in claim 1 wherein said movable end portion of said torsion bar has a longitudinal central axis which extends transverse to the longitudinal central axis of said intermediate portion of said torsion bar, said intermediate portion and movable end portion of said torsion bar being interconnected by an arcuate bend portion, said fixed end portion, intermediate portion, arcuate bend portion, and movable end portion of said torsion bar being integrally formed as one piece.

5. An apparatus as set forth in claim 1 wherein said retainer includes a body of elastomeric material which extends around said intermediate portion of said torsion bar, said body of elastomeric material being resiliently compressible under the influence of force transmitted from said intermediate portion of said torsion bar to said body of elastomeric material to accommodate limited movement of said intermediate portion of said torsion bar in a direction transverse to the longitudinal central axis of said torsion bar.

6. An apparatus as set forth in claim 1 wherein said retainer includes an arcuate surface which extends around said intermediate portion of said torsion bar and forms a portion of a sphere having a central axis which is coincident with the longitudinal central axis of said intermediate portion of said torsion bar.

7. An apparatus as set forth in claim 6 wherein said arcuate surface which extends around said intermediate portion of said torsion bar and forms a portion of a sphere is fixedly connected with said intermediate portion of said torsion bar.

8. An apparatus as set forth in claim 6 further including a bearing extending around said intermediate portion of said torsion bar and disposed in engagement with said arcuate surface which extends around said intermediate portion of said torsion bar and forms a portion of a sphere, said arcuate surface being rotatable relative to said bearing upon resilient twisting of said torsion bar about the longitudinal central axis of said intermediate portion of said torsion bar during operation of the vehicle.

9. An apparatus as set forth in claim 1 wherein said retainer includes an inner housing which extends around said intermediate portion of said torsion bar, an outer housing which extends around said inner housing, and a body of elastomeric material disposed between said inner and outer housings, said body of elastomeric material being resiliently compressible between said inner and outer housings under the influence of force transmitted from said intermediate portion of said torsion bar through said inner housing to said body of elastomeric material during operation of the vehicle.

10. An apparatus as set forth in claim 1 wherein said torsion bar is integrally formed as one piece and includes a first linear leg, a second linear leg and a bend interconnecting said first and second linear legs, said second linear leg extends perpendicular to said first linear leg, said fixed end portion of said torsion bar being disposed adjacent an end of said first linear leg opposite from said bend, said movable end portion of said torsion bar being disposed adjacent to an end of said second linear leg opposite from said bend, said intermediate portion of said torsion bar being disposed on said first linear leg between said fixed end portion and said bend.

11. An apparatus as set forth in claim 10 further including a strut integrally formed as one piece with said torsion bar, said strut includes a third linear leg having a first end connected with said second linear leg and a second end pivotally connected with the frame of the vehicle, said third leg extends at an acute angle to said second leg.

12. An apparatus for use in a suspension system for a steerable vehicle wheel, said apparatus comprising:
   a torsion bar having a first linear leg, a second linear leg extending perpendicular to said first linear leg and a bend interconnecting said first and second linear legs, said first linear leg having a fixed end portion held against movement relative to a frame of the vehicle, said second linear leg having a movable end portion connected with a support member for the steerable vehicle wheel, said movable end portion of said second linear leg of said torsion bar being movable up and down relative to said fixed end portion of said first linear leg of said torsion bar to resiliently twist said first linear leg of said torsion bar about a longitudinal central axis of said first linear leg of said torsion bar during operation of the vehicle; and a linear strut integrally formed as one piece with said torsion bar, said linear strut having a first end portion fixedly connected with said second linear leg of said torsion bar and movable up and down with said second linear leg of said torsion bar during operation of the vehicle, said linear strut having a second end portion pivotally connected with the frame of the vehicle.

13. An apparatus as set forth in claim 12 wherein said second end portion of said linear strut is pivotal about an axis which extends parallel to said first linear leg of said torsion bar.

14. An apparatus as set forth in claim 12 further including a retainer having a body of elastomeric material which extends around a portion of said first linear leg of said torsion bar, said body of elastomeric material is resiliently deflectable under the influence of force transmitted from said first linear leg of said torsion bar to resist movement of said first linear leg of said torsion bar in a direction transverse to said first linear leg of said torsion bar during operation of the vehicle.

15. An apparatus as set forth in claim 12 further including a ball joint having a housing fixedly connected with said movable end portion of said second linear leg and with the support member for the steerable vehicle wheel.

\* \* \* \* \*